US012561346B1

(12) United States Patent
Li

(10) Patent No.: US 12,561,346 B1
(45) Date of Patent: Feb. 24, 2026

(54) LLM-POWERED MICROSERVICE REGISTRATION AND DISCOVERY

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/939,140

(22) Filed: Nov. 6, 2024

(51) Int. Cl.
*G06F 16/00* (2019.01)
*G06F 16/22* (2019.01)
*G06F 16/28* (2019.01)
*G06F 40/20* (2020.01)

(52) U.S. Cl.
CPC ........ *G06F 16/285* (2019.01); *G06F 16/2237* (2019.01); *G06F 40/20* (2020.01)

(58) Field of Classification Search
CPC ...... G06F 40/30; G06F 40/279; G06F 40/295; G06F 16/345; G06F 40/40; G06F 16/31; G06F 40/186; G06F 40/44; G06F 7/483; G06F 1/26; G06F 13/364; G06F 13/4291; G06F 30/20; G06F 7/5443; G06F 9/5027; G06F 16/2379; G06F 16/9024; G06F 5/012; G06F 7/4876; G06F 7/49915; G06F 7/49947; G06F 9/30014; G06F 9/30036; G06F 9/3016; G06N 3/0455; G06N 3/08; G06N 3/045; G06N 3/04;

G06N 3/063; G06N 7/01; G06N 7/08; G06Q 50/18; G06Q 20/10; G10L 15/26; G10L 15/063; G10L 15/16
See application file for complete search history.

(56) References Cited

U.S. PATENT DOCUMENTS

| | | | |
|---|---|---|---|
| 11,650,986 B1* | 5/2023 | Agbemabiese ... | G06F 16/24553 707/737 |
| 2021/0295822 A1* | 9/2021 | Tomkins ............. | G06F 16/3338 |
| 2023/0252478 A1* | 8/2023 | Saleh ................. | G06Q 20/4016 705/44 |
| 2024/0419907 A1* | 12/2024 | Laprise .................. | G01C 21/34 |

* cited by examiner

*Primary Examiner* — Shyue Jiunn Hwa
(74) *Attorney, Agent, or Firm* — SCHWEGMAN LUNDBERG & WOESSNER, P.A.

(57) ABSTRACT

When registering with a microservice system, each service provides a natural-language description of itself. An application programming interface (API) is used to generate a vector representation of the description, referred to as a service vector. A user searches for a service by providing a natural-language description of the service. The API is used to generate a vector representation of the provided description, referred to as a search vector. This vector representation is compared to vector representations stored in the database to identify one or more candidate services. Efficiency of the search is improved by clustering the services. A vector representation for each cluster, referred to as a cluster vector, may be generated. The search vector may be compared to the cluster vectors. Once a closest matching cluster vector is identified, the search vector may be compared to the service vectors for the services in the cluster.

20 Claims, 9 Drawing Sheets

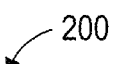
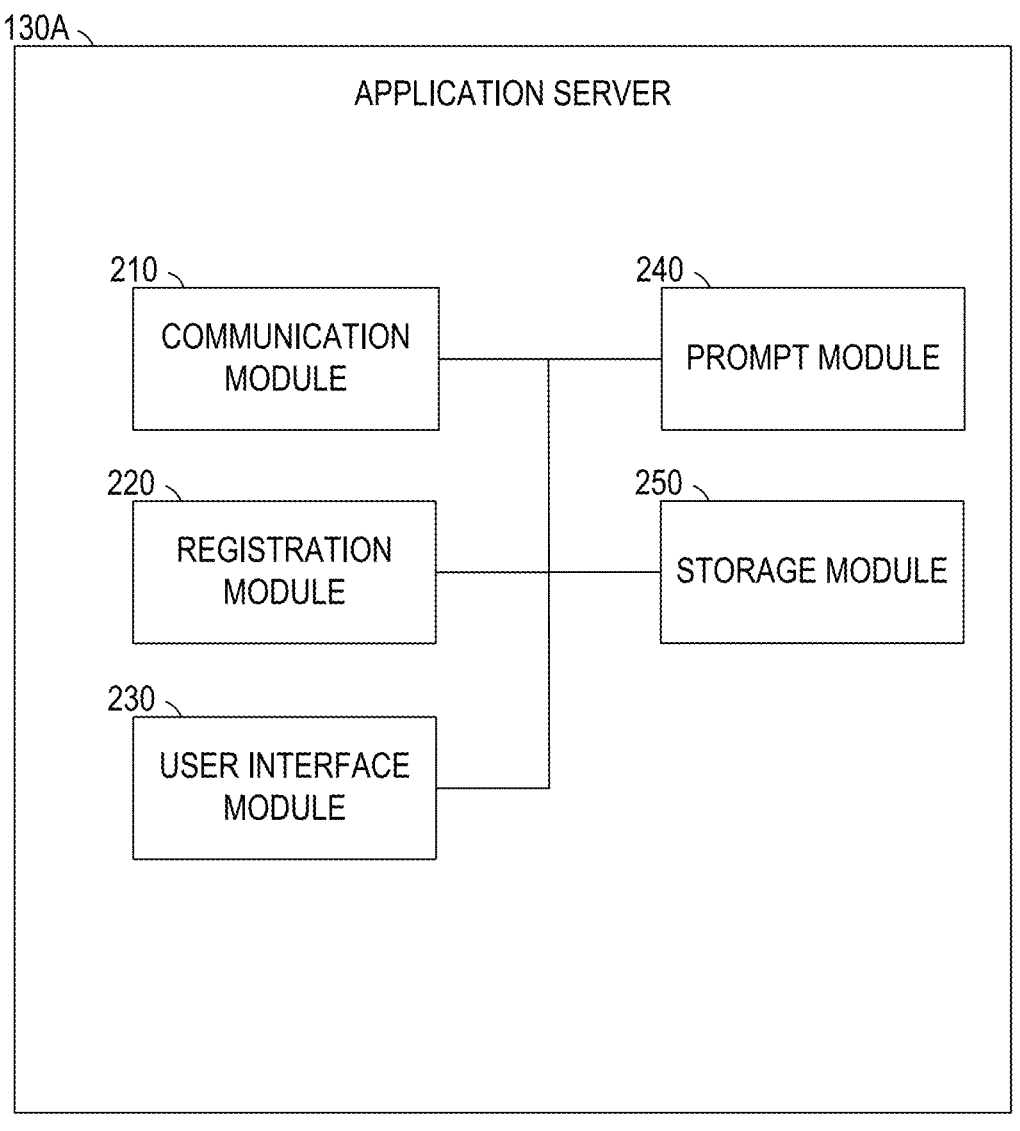
*FIG. 2*

400

| SERVICE TABLE | | | | |
|---|---|---|---|---|
| SERVICE | ADDRESS | DESCRIPTION | EMBEDDINGS | CLUSTER |
| SVC1 | HTTP://SVC1/V1 | <DESCRIPTION> | <VECTOR> | 1 |
| SVC2 | HTTP://SVC2/V1 | <DESCRIPTION> | <VECTOR> | 1 |
| SVC3 | HTTP://SVC3/V1 | <DESCRIPTION> | <VECTOR> | 2 |
| SVC4 | HTTP://SVC4/V1 | <DESCRIPTION> | <VECTOR> | 2 |

410 — SERVICE TABLE
420 — (header row)
430A — SVC1
430B — SVC2
430C — SVC3
430D — SVC4

| CLUSTER TABLE | |
|---|---|
| ID | EMBEDDINGS |
| 1 | <VECTOR> |
| 2 | <VECTOR> |

440 — CLUSTER TABLE
450 — (header row)
460A — 1
460B — 2

510 — SERVICE SEARCH

DESCRIBE THE SERVICE YOU ARE LOOKING FOR

520

A TOURIST ATTRACTION TICKET RESERVATION SERVICE PROVIDING CROWD FLOW PREDICTION AND 3D LANDSCAPE PREVIEW

530 — GO

600

SERVICE SEARCH

610

620

SVC1, ACCESSIBLE AT HTTP://SVC1/V1, PROVIDES A TICKET RESERVATION SERVICE

SVC2, ACCESSIBLE AT HTTP://SVC2/V1, PROVIDES CROWD FLOW PREDICTIONS

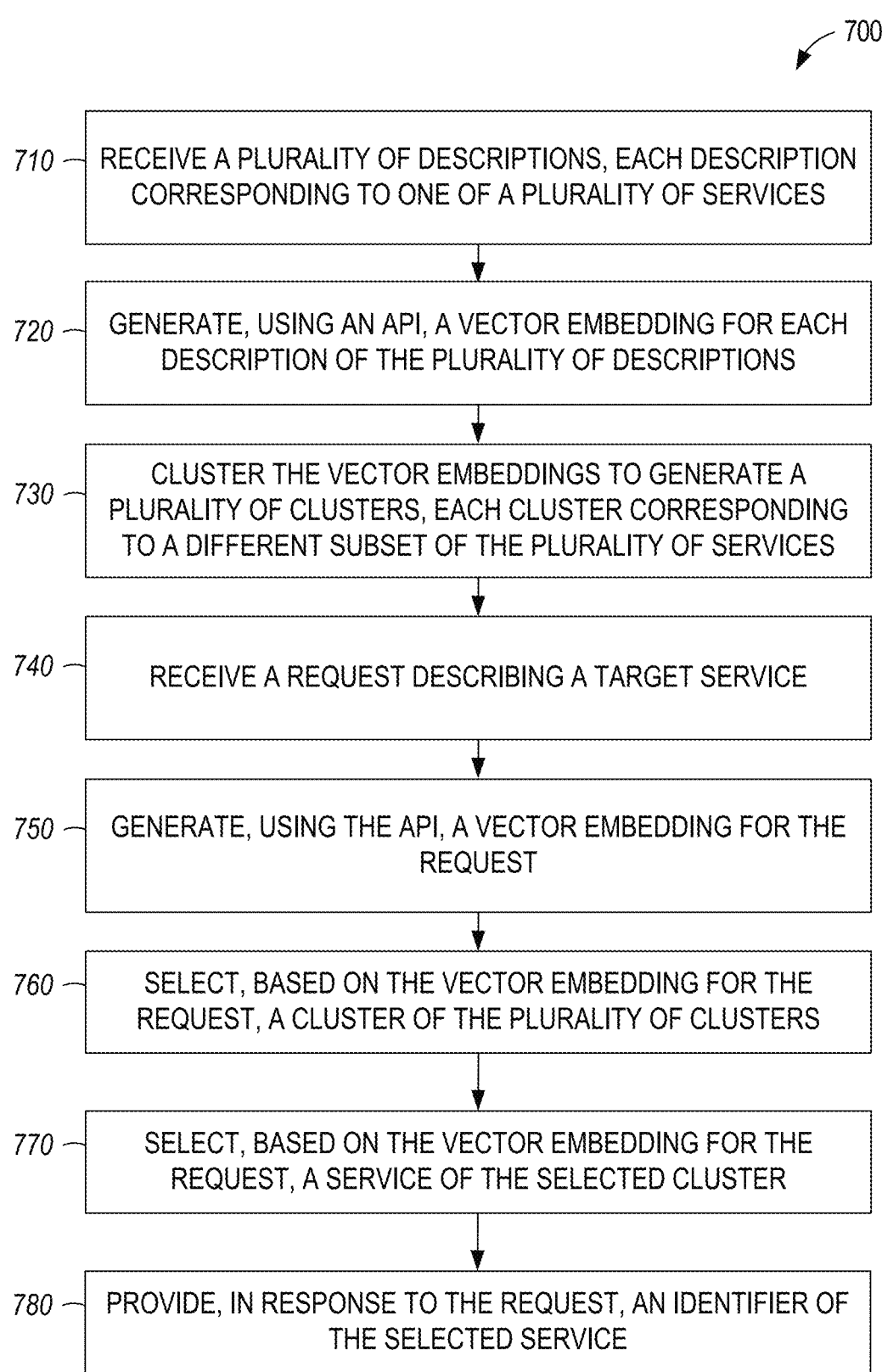

700

710 — RECEIVE A PLURALITY OF DESCRIPTIONS, EACH DESCRIPTION CORRESPONDING TO ONE OF A PLURALITY OF SERVICES

720 — GENERATE, USING AN API, A VECTOR EMBEDDING FOR EACH DESCRIPTION OF THE PLURALITY OF DESCRIPTIONS

730 — CLUSTER THE VECTOR EMBEDDINGS TO GENERATE A PLURALITY OF CLUSTERS, EACH CLUSTER CORRESPONDING TO A DIFFERENT SUBSET OF THE PLURALITY OF SERVICES

740 — RECEIVE A REQUEST DESCRIBING A TARGET SERVICE

750 — GENERATE, USING THE API, A VECTOR EMBEDDING FOR THE REQUEST

760 — SELECT, BASED ON THE VECTOR EMBEDDING FOR THE REQUEST, A CLUSTER OF THE PLURALITY OF CLUSTERS

770 — SELECT, BASED ON THE VECTOR EMBEDDING FOR THE REQUEST, A SERVICE OF THE SELECTED CLUSTER

780 — PROVIDE, IN RESPONSE TO THE REQUEST, AN IDENTIFIER OF THE SELECTED SERVICE

FIG. 7

LLM-POWERED MICROSERVICE REGISTRATION AND DISCOVERY

TECHNICAL FIELD

The subject matter disclosed herein generally relates to systems for registering and discovering microservices and, more specifically, to systems utilizing large language models (LLMs) to register and discover microservices.

BACKGROUND

Many cloud systems use microservices, which are composed of many independent small services. The small services often communicate with each other using application programming interfaces (APIs) and communication protocols such as hypertext transport protocol (HTTP) or Google Remote Procedure Calls (gRPC).

Services register with a register center, providing information such as address, host, status, and documentation. A service may access the register center to retrieve information about another service and use the retrieved information to access the other service. Generally, a request for information about a service is made by including the name of the service for which information is being requested.

BRIEF DESCRIPTION OF THE DRAWINGS

FIG. 2 shows a block diagram of an application server, suitable for LLM-powered microservice registration and discovery.

FIG. 4 shows an illustration of an example database schema, suitable for use in LLM-powered microservice registration and discovery.

FIG. 7 shows a flowchart illustrating a method of LLM-powered microservice registration and discovery.

DETAILED DESCRIPTION

Example methods and systems are directed to LLM-powered microservice registration and discovery. As described herein, a machine learning model is used to receive natural-language service descriptions and generate vector representations of the descriptions.

A microservice system may integrate multiple services with similar functions. The system may support multiple tenants, and different tenants may have different preferences for similar services. For example, the microservice system may integrate several different services for reserving tickets for tourist attractions. Instead of searching for services by name, the systems and methods disclosed herein allow for searching for services by description.

When registering, each service provides a natural-language description of itself. An LLM is used to generate a vector representation of the description, referred to as a service vector. The service vector is stored in a database.

A user searches for a service by providing a natural-language description of the service. The LLM is used to generate a vector representation of the provided description, referred to as a search vector. This vector representation is compared to vector representations stored in the database to identify one or more candidate services. Information about the candidate services is presented in a user interface.

Efficiency of the search is improved by clustering the services. For example, the K-means clustering algorithm may be used to divide the set of available services into K clusters, where K is a predetermined number (e.g., five, ten, twenty, or fifty). A vector representation for each cluster, referred to as a cluster vector, may be stored in the database.

Instead of comparing the search vector to all available service vectors, the search vector may be compared to the cluster vectors. Once a closest matching cluster vector is identified, the search vector may be compared to the service vectors for the services in the cluster. The comparison of a search vector with a cluster vector or a service vector may be performed using a cosine correlation coefficient.

By use of the described systems and methods, the ability to search for services by description rather than by name is added to microservice architectures. By comparison with systems that use keyword matching, the disclosed systems and methods are improved by allowing for matches to be detected by semantic similarity instead of requiring identical words. Furthermore, by comparison with systems that perform exhaustive comparisons between a search and candidate services, the disclosed systems and methods are improved by using clustering to reduce the number of comparisons performed.

Figure 1:
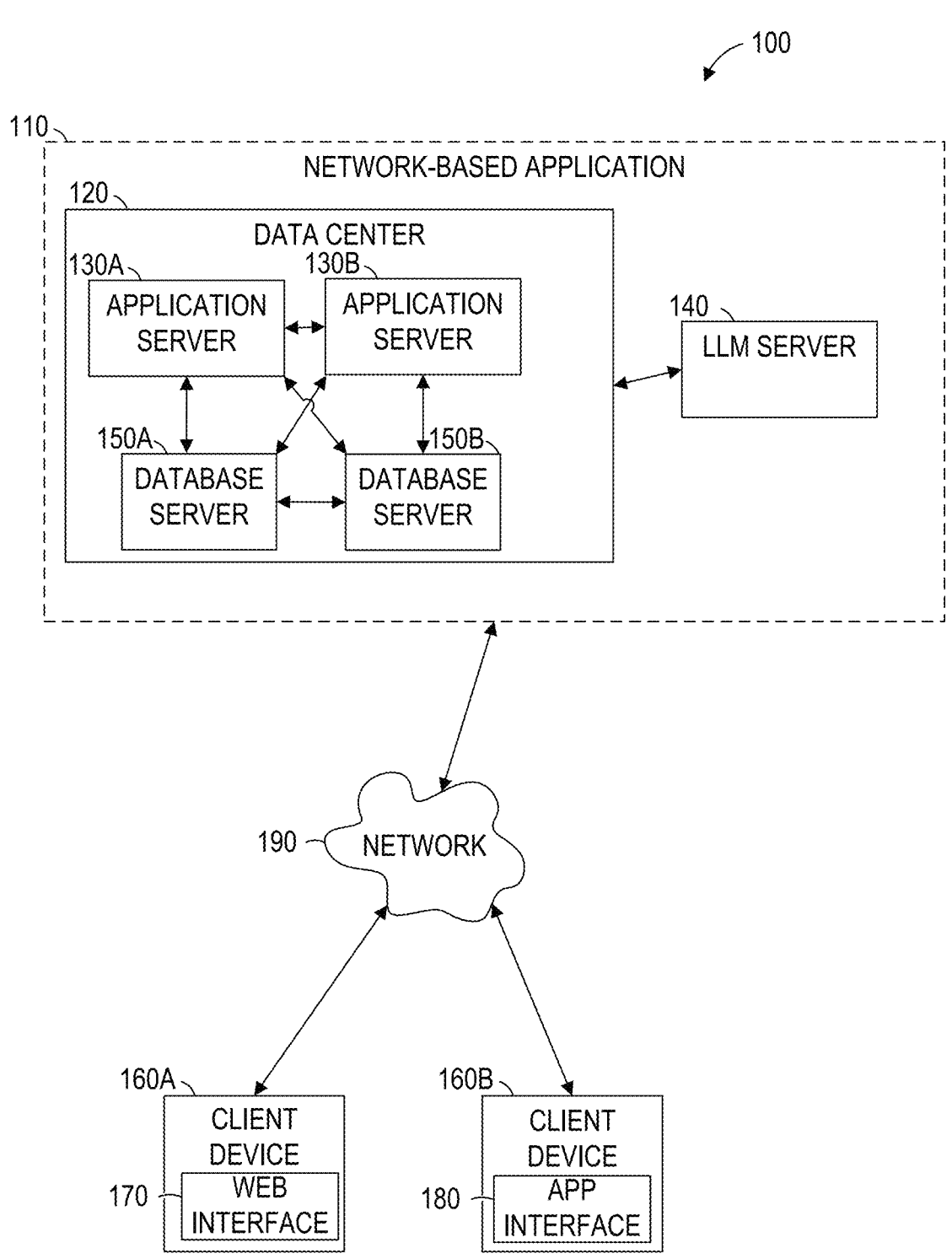
FIG. 1 shows a network diagram illustrating an example network environment suitable for LLM-powered microservice registration and discovery.

FIG. 1 shows a network diagram illustrating an example network environment 100 suitable for LLM-powered microservice registration and discovery. The network environment 100 includes a network-based application 110, an LLM server 140, client devices 160A and 160B, and a network 190. The network-based application 110 is implemented at a data center 120 comprising application servers 130A and 130B in communication with database servers 150A and 150B. An application executing on the application servers 130A-130B may access data from the database servers 150A-150B. The letter suffixes of reference numbers may be omitted when doing so does not raise ambiguity. For example, the application servers 130A-130B may be referred to collectively as "application servers 130." Similarly, when the specific one of the application servers 130A-130B is not of particular import, "application server 130" may be referenced.

The application running on the application server 130 may provide services to the client devices 160A and 160B. For example, a user of the client device 160A may be an employee of a business using a business application. The user may use the services to generate invoices, manage employees, develop other applications, or any suitable combination thereof. Use of the application may entail filtering data (e.g., to review certain invoices, employees, applications, or the like). The user interface for the application may be presented using a web interface 170 or an app interface 180.

The network-based application 110 may be implemented using a collection of microservices. One or more of the application servers 130 may act as a registration server. Microservices register themselves with the registration server. Once a microservice is registered, it can be discovered by requests to the registration server. For example, a user of the client device 160A may request information about a microservice by providing the name of the microservice or a description of the microservice to the registration server. In response, the registration server provides information about one or more registered microservices. The user may use the provided information to configure the network-based application 110 to make use of one or more of the microservices.

The LLM server 140 may include a machine learning model trained to convert natural language microservice descriptions into vector representations. A user of a client device 160 may send a natural language description of a target microservice to an application server 130. The application server 130 sends the natural language description to the LLM server 140 and receives, in response, a vector representation of the description. The application server 130 uses the vector representation to search a database server 150 and find microservices that are responsive to the request. The application server 130 may provide information about the responsive microservices to the client device 160 for presentation to the user.

The application servers 130 may communicate with the database servers 150 using a representational state transfer (REST) API, the Open Data Protocol (ODATA), or another API. The data may be described in metadata that provides contextual information related to the data. Metadata includes column names, data types and data relationships. If the values are from a fixed dataset, the dataset may be loaded and the loaded information used as a table description.

The application servers 130A-130B, the LLM server 140, the database servers 150A-150B, and the client devices 160A-160B may each be implemented in a computer system, in whole or in part, as described below with respect to FIG. 9. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database, a disk-based database, a remote database, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 130A-130B, the LLM server 140, the database servers 150A-150B, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one LLM server 140, two application servers 130A-130B, two client devices 160A and 160B, and the like), any number of each element is contemplated. For example, the application server 130A may be one of dozens or hundreds of active and standby servers and provide services to millions of client devices. Likewise, the LLM server 140 may be used by many application servers 130, and so on.

FIG. 2 shows a block diagram 200 of the application server 130A, suitable for LLM-powered microservice registration and discovery. The application server 130A is shown as including a communication module 210, a registration module 220, a user interface module 230, a prompt module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 130A and transmits data from the application server 130A. For example, the communication module 210 may send a user interface (e.g., hypertext markup language [HTML] for rendering in a web browser) from the user interface module 230 to the client device 160A. The communication module 210 may receive, from the client device 160A and via the user interface, a request for microservices, the request including a natural language description of the target microservice. In response, the communication module 210 provides the natural language description to the LLM server 140 and, in response, receives a vector representation of the description. The communication module 210 may access vector representations of descriptions of registered microservices from the database server 150A.

Based on the vector representations of the registered microservices and the vector representation of the description of the target microservice, the application server 130A identifies one or more responsive microservices. The user interface module 230 causes the user interface to be updated with the responsive data.

The registration module 220 performs registration of microservices, updating a database with information about registered microservices such as name, port, host name, description, IP address, and the like. The registration process may include receiving a natural language description of the microservice, generating a prompt for an LLM by the prompt module 240, and receiving a vector representation of the natural language description from the LLM in response to the prompt.

Data, metadata, documents, instructions, or any suitable combination thereof may be stored and accessed by the storage module 250. For example, local storage of the application server 130A, such as a hard drive, may be used. As another example, network storage may be accessed by the storage module 250 via the network 190.

Figure 3:
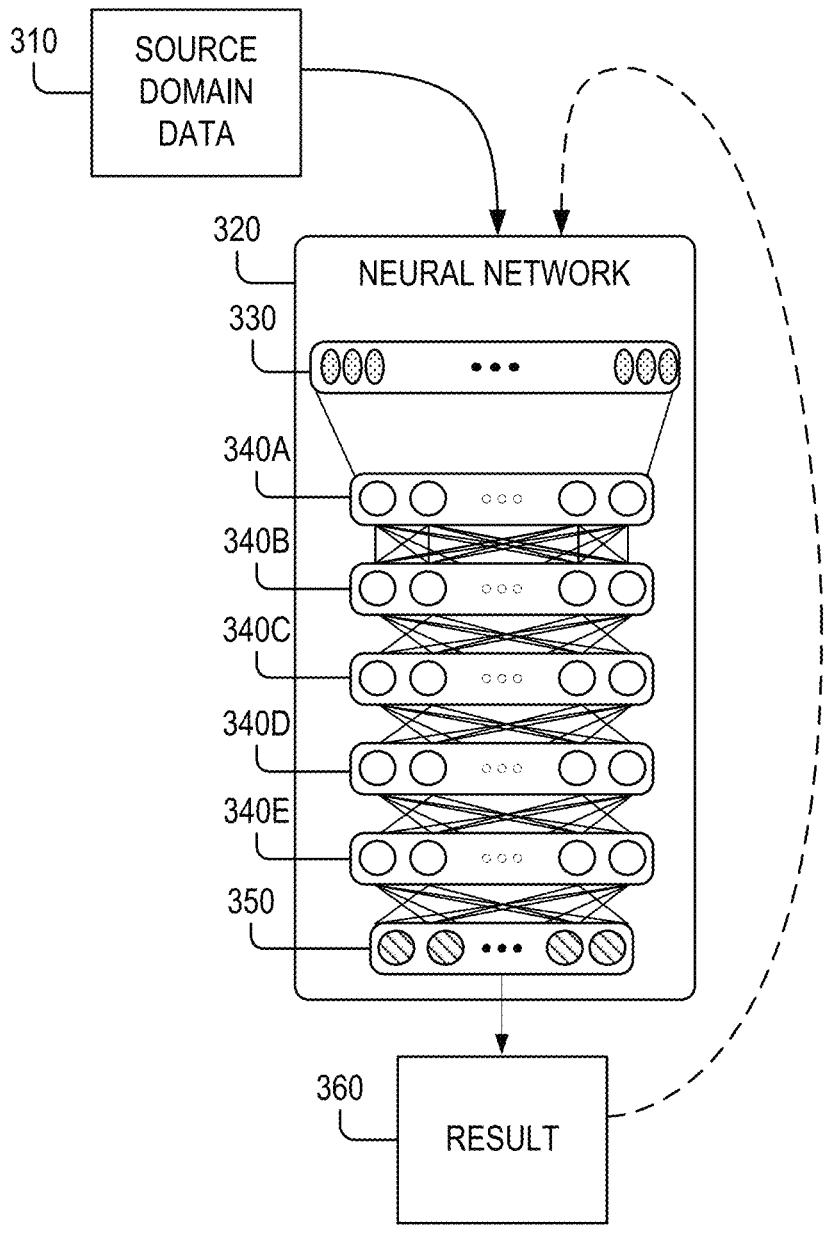
FIG. 3 is a block diagram of a neural network, suitable for use as an LLM that generates vectors for microservice registration and discovery, according to some example embodiments.

FIG. 3 is a block diagram of a neural network 320, suitable for use as an LLM that generates vectors for microservice registration and discovery, according to some example embodiments. The neural network 320 takes source domain data 310 as input and processes the source domain data 310 using an input layer 330; intermediate, hidden layers 340A, 340B, 340C, 340D, and 340E; and output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between one and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network (CNN), a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like. With the help of natural language processing (NLP) and advanced data pre-processing, a machine learning model (e.g., the neural network 320) can be trained on existing data (for instance, natural-language filtering instructions) from the system to generate corresponding output (e.g., database commands).

The transformer architecture processes an entire input at once rather than sequentially. For example, a recurrent neural network (RNN) processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process. The output may still be generated sequentially, with the previous result (e.g., word for an LLM, pixel for an image-generating artificial intelligence, and the like) being provided as an input for determination of the next result.

FIG. 4 shows an illustration of an example database schema 400, suitable for use in LLM-powered microservice registration and discovery. The database schema 400 includes a service table 410 and a cluster table 440. The service table 410 includes rows 430A, 430B, 430C, and 430D of a format 420. The cluster table 440 includes rows 460A and 460B of a format 450.

Each of the rows 430A-430D of the service table 410 shows a service name, an address, a text description, a vector embedding, and a cluster. The cluster table 440 shows a cluster identifier and a vector embedding for each cluster, as indicated by the format 450.

The service table 410, the cluster table 440, or both, may include more or fewer fields than shown in FIG. 4. Example additional fields include: an availability of a service, a port of a service, a number of members of a cluster, a date on which a service was registered, a date on which a cluster was formed, or any suitable combination thereof. The database schema 400 may include additional tables to track additional types of data, such as users, businesses, products, and the like. The service table 410 and the cluster table 440 may be combined into a single table that repeats cluster data for each service in the cluster.

Data from the service table 410 and the cluster table 440 may be selected using filters. For example, all services in a cluster may be selected by applying a filter to the Cluster column (e.g., SELECT*FROM Service_Table WHERE Cluster=1).

When a service is registered, a corresponding row in the service table 410 may be created. The description may be provided by the service. A vector embedding may be created by the registration server and stored in the row.

At regular intervals (e.g., daily or weekly) or in response to specific events (e.g., the registration of a new service), the services may be assigned to clusters. A vector embedding for each cluster is stored in the cluster table 440.

A user may search for a service by providing a description of the target service. The search server may generate a vector embedding for the provided description (a search vector). Using the embeddings in the cluster table 440, a cluster is identified (e.g., by selecting the cluster whose embedding is the shortest Euclidean distance from the search vector). By cross-referencing data in the service table 410 with data in the cluster table 440 using the cluster identifier fields, the services in the identified cluster are determined.

Using the embeddings in the service table 410, a service is identified (e.g., by selecting the service whose embedding in the shortest Euclidean distance from the search vector). Thus, a service can be identified that is responsive to the user's search.

Figure 5:
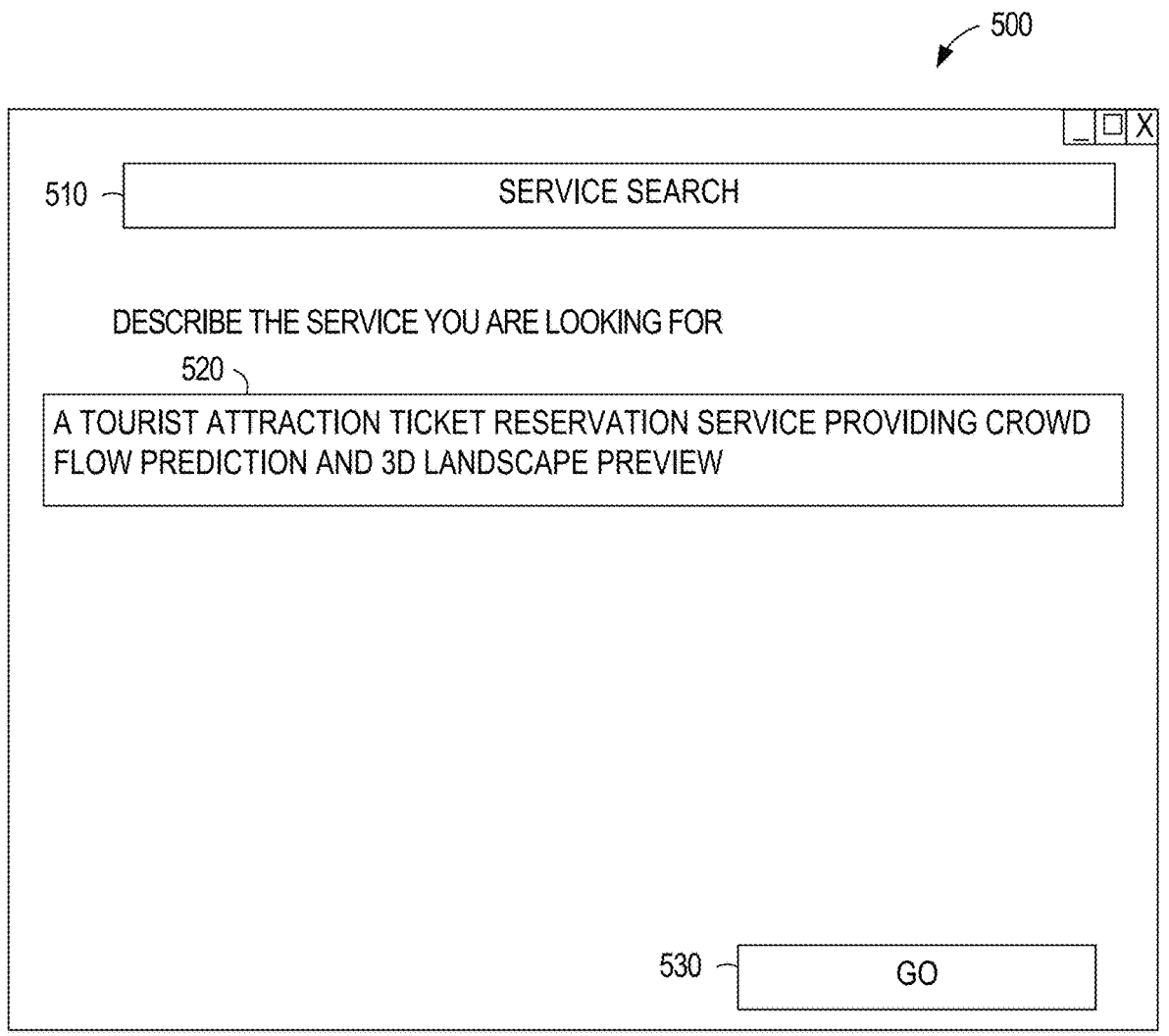
FIG. 5 shows an illustration of an example user interface for searching for services.

FIG. 5 shows an illustration of an example user interface 500 for searching for services. The user interface 500 may be generated by the application server 130A and presented on a display device of the client device 160A or 160B, all of FIG. 1. The user interface 500 may be presented to allow a user to search for available services. The user interface 500 includes a title 510, a filter area 520, and a button 530.

The title 510 indicates that the user interface 500 includes options for searching for services. The filter area 520 receives a text description of the service the user is trying to find (referred to as the "target service" herein). The button 530 is operable to submit the query to the application server 130A.

Figure 6:
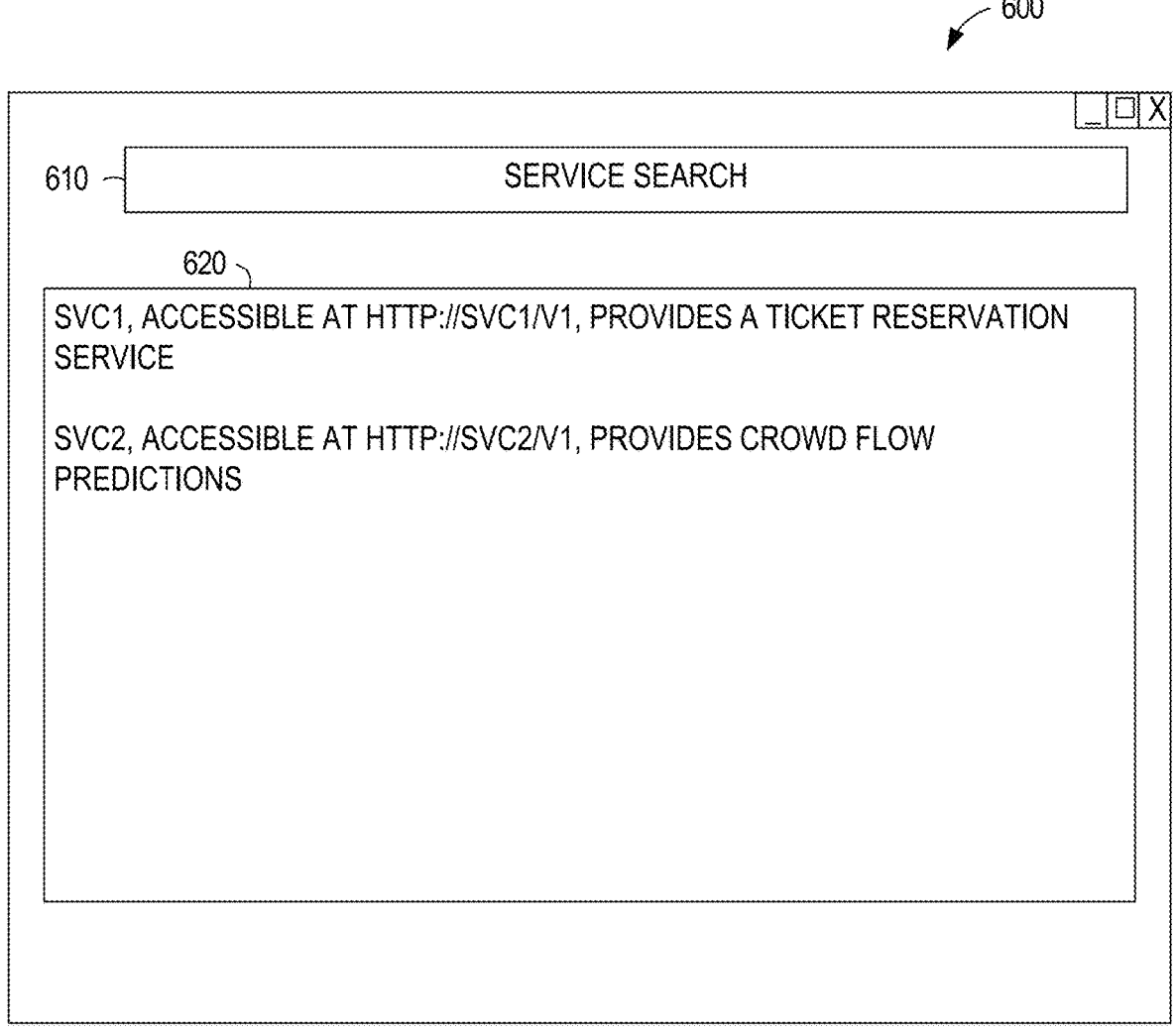
FIG. 6 shows an illustration of an example user interface for displaying results of a service search.

FIG. 6 shows an illustration of an example user interface 600 for displaying results of a service search. The user interface 600 may be generated by the application server 130A and presented on a display device of the client device 160A or 160B, all of FIG. 1. The user interface 600 may be presented in response to operation of the button 530 of FIG. 5. The user interface 600 includes a title 610 and a result area 620.

The title 610 indicates that the user interface 600 is for a service search. The result area 620 shows information about one or more services. In the example of FIG. 6, the result area 620 shows information for two services. The information shown for each service is a name, an address, and a description.

Using the information shown, the user is enabled to access one or more services. For example, the user may be an application developer and may choose to modify an application to access the service SVC1 by making a REST API call to HTTP://SVC1/V1.

FIG. 7 shows a flowchart illustrating a method 700 of LLM-powered microservice registration and discovery. The method 700 includes operations 710, 720, 730, 740, 750, 760, 770, and 780. By way of example and not limitation, the method 700 is described as being performed by the application server 130A of FIG. 1, using the modules of FIG. 2 and the database schema of FIG. 4.

In operation 710, the registration module 220 receives a plurality of descriptions, each description corresponding to one of a plurality of services. For example, each service may register itself by providing information about itself to the registration module 220. The provided information may include a text description, such as "SVC1 provides services to reserve tickets at tourist attractions."

The prompt module 240, in operation 720, generates, using an API, a vector embedding for each description of the plurality of descriptions. For example, the pseudo-code below gets a vector embedding for a text string:

```
import openai
response=openai. Embedding. create (model="text-em-
    bedding-ada-002"
    input="SVC1 provides services to reserve tickets at
    tourist attractions.") V=response ["data"] [0] ["em-
    bedding"]
```

In response to the above API call, the library may generate a 1536-dimension floating-point vector, a portion of which is shown below as an example:

V=[0.001, 0.0015, −0.0030, . . . , 0.002]

By providing a separate prompt for each service and receiving a vector in response, a vector embedding is generated for each description of the plurality of descriptions. The data for each service, including the generated vector embedding, may be stored in the service table 410 of FIG. 4.

In operation 730, the application server 130A clusters the vector embeddings to generate a plurality of clusters, each cluster corresponding to a different subset of the plurality of services. In some example embodiments, K-means clustering is used to generate K clusters. K may be a predetermined number (e.g., five, ten, twelve, fifteen, twenty, or one hundred). The key steps of K-Means clustering are as follows:

(1). Initialization: Choose the number of clusters (K) and randomly initialize the centroids of these clusters.

(2). Assignment: Assign each data point to the nearest centroid. The "nearest" here is usually defined by the Euclidean distance in the feature space. The vector embeddings are the data points.

(3). Update: Recalculate the centroids of each cluster after the assignment step. The new centroid is typically the mean value of all data points in the cluster.

(4). Iteration: Repeat the assignment and update steps until the centroids do not change significantly (e.g., the largest change in centroid value is less than a predetermined threshold) or a maximum number of iterations is reached.

(5). Evaluation: Evaluate the quality of the clusters, typically using measures like the silhouette score or the within-cluster sum of squares.

This process ensures that the algorithm keeps improving the quality of the clusters until it can no longer make significant improvements. Each step is relatively straightforward, but when they are carried out iteratively, they can yield very sophisticated results.

The centroid for each cluster may be stored in the embeddings column of the cluster table 440 of FIG. 4. After completion of operation 730, the application server 130A is ready to receive natural language requests for services.

In operation 740, the application server 130A receives a request describing a target service. The user interface 500 of FIG. 5 may be used by a user to submit the request. Accordingly, the request may include "a tourist attraction ticket reservation service providing crowd flow prediction and 3D landscape preview."

The prompt module 240, in operation 750, generates, using an API, a vector embedding for the request. For example, one prompt may be:

```
import openai
response=openai. Embedding. create (model="text-em-
    bedding-ada-002"
    input="a tourist attraction ticket reservation service
    providing crowd flow prediction and 3D landscape
    preview") V=response ["data"] [0] ["embedding"]
```

In response to the above API call, the library may generate a 1536-dimension floating-point vector, a portion of which is shown below as an example:

V=[0.0012, 0.005, −0.0020, . . . , 0.001]

In operation 760, the application server 130A selects, based on the vector embedding for the request, a cluster of the plurality of clusters. A Euclidean distance or cosine correlation coefficient between the vector embedding generated in operation 750 and the centroids for the clusters generated in operation 730 may be determined. The cluster having the lowest Euclidean distance or the highest cosine correlation coefficient may be selected.

The Euclidean distance between two vectors x and y of length n is defined as:

$$\|x - y\| = \sqrt{\sum_{i=1}^{n} (x_i - y_i)^2}$$

The cosine correlation coefficient between two vectors x and y of length n is defined as:

$$c_{x,y} = \frac{\sum_{i=1}^{n} (x \cdot y)}{\sqrt{\sum_{i=1}^{n} x_i^2} \cdot \sqrt{\sum_{i=1}^{n} y_i^2}}$$

As applied in operation 760, n is the dimension of the vector embeddings, x is the request vector, and the cosine correlation coefficient is determined for each centroid y. The cluster for which the cosine correlation coefficient is highest may be selected as being most semantically similar to the request.

To illustrate, the cluster of the row 460A of the cluster table 440 of FIG. 4 may be selected in operation 760.

In operation 770, the application server 130A selects, based on the vector embedding for the request, a service of the selected cluster. For example, the rows 430A and 430B of the service table 410 may be accessed based on the cluster identifier of the rows 430A-430B being equal to the cluster identifier of the row 460A. A Euclidean distance or cosine correlation coefficient between the vector embedding generated in operation 750 and the stored embeddings for services of the cluster may be determined. The service having the lowest Euclidean distance or the highest cosine correlation coefficient may be selected. To illustrate, the service of the row 430A may be selected.

Instead of selecting the single service with a highest cosine correlation coefficient, multiple services may be identified based on a predetermined threshold. For example, all services with a cosine correlation coefficient of at least 0.8 may be selected as an initial candidate set. As another example, a predetermined number of services (e.g., three, five, or ten) with the highest cosine correlation coefficients may be selected as the initial candidate set.

To select a single service from among the initial candidate set, a prompt may be sent to the LLM. In response to the prompt, the LLM identifies the service to be selected for recommendation. For example, the prompt template below may be used.

You are a web service maintenance expert. Users request to find some services that meet the following criteria. {user's request}
The entries for the candidate services are as follows {candidate service descriptions}
Please return the qualified services that meet the user's needs. Just return the serial numbers in the following format
{example answer}
If no services match the user's request, please do not try to answer this question, just return none.
If the LLM returns a serial number for a service, information about the service is looked up from a database based on the serial number. For example, the serial number may be the contents of the service field of the service table 410 of FIG. 4. Thus, an address and a description for the service may be looked up based on the serial number.

The application server 130A provides, in operation 780, in response to the request, an identifier of the selected service. The user interface 600 of FIG. 6 may be provided, including the identifier SVC1 for the selected service. Operation 770 may be modified to select multiple services (e.g., a predetermined number of services, all services with a cosine correlation coefficient exceeding a predetermined threshold, all services with a Euclidean distance below a predetermined threshold, or any suitable combination thereof). Correspondingly, operation 780 may be modified to provide identifiers of the multiple selected services.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: receiving a plurality of descriptions, each description corresponding to one of a plurality of services; generating, using an application programming interface (API), a vector embedding for each of the plurality of descriptions; clustering the vector embeddings to generate a plurality of clusters, each cluster corresponding to a different subset of the plurality of services; receiving a request describing a target service; generating, using the API, a vector embedding for the request; selecting, based on the vector embedding for the request, a cluster of the plurality of clusters; selecting, from among the subset of the plurality of services corresponding to the selected cluster, a service; and providing, in response to the request, an identifier of the selected service.

In Example 2, the subject matter of Example 1, wherein the selecting of the service from among the subset of the plurality of services corresponding to the selected cluster comprises generating a prompt for a large language model (LLM) that identifies the subset of the plurality of services corresponding to the selected cluster.

In Example 3, the subject matter of Examples 1-2, wherein the generating of the plurality of clusters comprises generating a predetermined number of clusters.

In Example 4, the subject matter of Examples 1-3, wherein the generating of the plurality of clusters comprises using K-means clustering.

In Example 5, the subject matter of Examples 1-4, wherein the operations further comprise determining a vector embedding for each cluster of the plurality of clusters.

In Example 6, the subject matter of Example 5, wherein the selecting of the cluster comprises determining a correlation coefficient between the vector embedding for the request and each of the vector embeddings for the plurality of clusters.

In Example 7, the subject matter of Example 6, wherein the selecting of the cluster comprises selecting the cluster having a highest correlation coefficient.

In Example 8, the subject matter of Examples 1-7, wherein the selecting of the service comprises determining a correlation coefficient between the vector embedding for the request and the vector embedding for each service of the subset of the plurality of services corresponding to the selected cluster.

In Example 9, the subject matter of Examples 1-8, wherein the selecting of the service comprises selecting the service having a highest correlation coefficient.

Example 10 is a non-transitory computer-readable medium that stores instructions that, when executed by one or more processors, cause the one or more processors to perform operations comprising: receiving a plurality of descriptions, each description corresponding to one of a plurality of services; generating, using an application programming interface (API), a vector embedding for each of the plurality of descriptions; clustering the vector embeddings to generate a plurality of clusters, each cluster corresponding to a different subset of the plurality of services; receiving a request describing a target service; generating, using the API, a vector embedding for the request; selecting, based on the vector embedding for the request, a cluster of the plurality of clusters; selecting, from among the subset of the plurality of services corresponding to the selected cluster, a service; and providing, in response to the request, an identifier of the selected service.

In Example 11, the subject matter of Example 10, wherein the selecting of the service from among the subset of the plurality of services corresponding to the selected cluster comprises generating a prompt for a large language model (LLM) that identifies the subset of the plurality of services corresponding to the selected cluster.

In Example 12, the subject matter of Examples 10-11, wherein the generating of the plurality of clusters comprises generating a predetermined number of clusters.

In Example 13, the subject matter of Examples 10-12, wherein the generating of the plurality of clusters comprises using K-means clustering.

In Example 14, the subject matter of Examples 10-13, wherein the operations further comprise determining a vector embedding for each cluster of the plurality of clusters.

In Example 15, the subject matter of Example 14, wherein the selecting of the cluster comprises determining a correlation coefficient between the vector embedding for the request and each of the vector embeddings for the plurality of clusters.

In Example 16, the subject matter of Example 15, wherein the selecting of the cluster comprises selecting the cluster having a highest correlation coefficient.

In Example 17, the subject matter of Examples 10-16, wherein the selecting of the service comprises determining a correlation coefficient between the vector embedding for the request and the vector embedding for each service of the subset of the plurality of services corresponding to the selected cluster.

Example 18 is a method comprising: receiving, by one or more processors, a plurality of descriptions, each description corresponding to one of a plurality of services; generating, using an application programming interface (API), a vector embedding for each of the plurality of descriptions; clustering the vector embeddings to generate a plurality of clusters, each cluster corresponding to a different subset of the plurality of services; receiving a request describing a target service; generating, using the API, a vector embedding for the request; selecting, based on the vector embedding for the request, a cluster of the plurality of clusters; selecting, from among the subset of the plurality of services corresponding to the selected cluster, a service; and providing, in response to the request, an identifier of the selected service.

In Example 19, the subject matter of Example 18, wherein the selecting of the service from among the subset of the plurality of services corresponding to the selected cluster comprises generating a prompt for a large language model (LLM) that identifies the subset of the plurality of services corresponding to the selected cluster.

In Example 20, the subject matter of Examples 18-19, wherein the generating of the plurality of clusters comprises generating a predetermined number of clusters.

Example 21 is an apparatus comprising means to implement of any of Examples 1-20.

Figure 8:
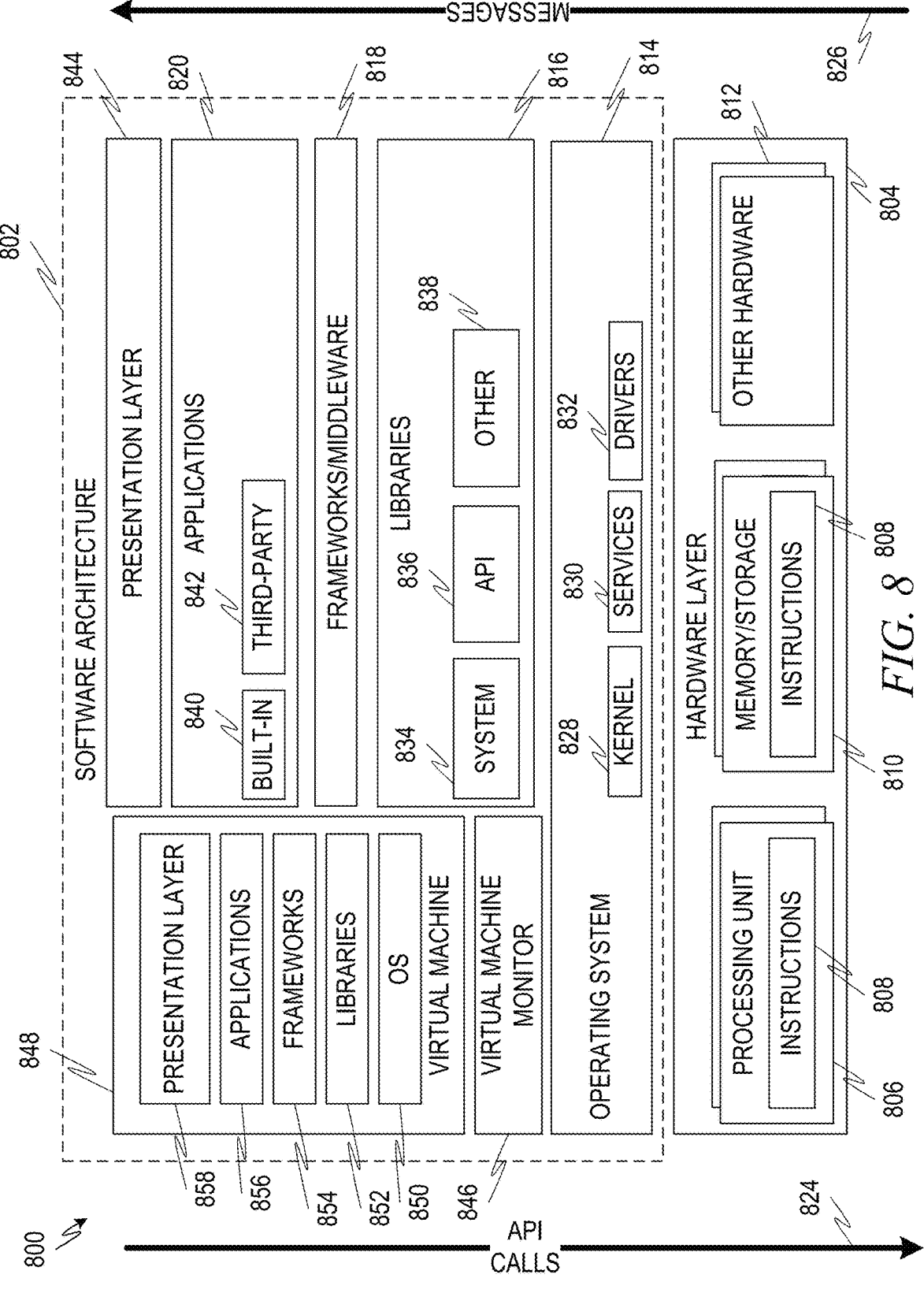
FIG. 8 shows a block diagram showing one example of a software architecture for a computing device.

FIG. 8 shows a block diagram 800 showing one example of a software architecture 802 for a computing device. The software architecture 802 may be used in conjunction with various hardware architectures, for example, as described herein. FIG. 8 is merely a non-limiting example of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the software architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and
Machine-Readable Medium

Figure 9:
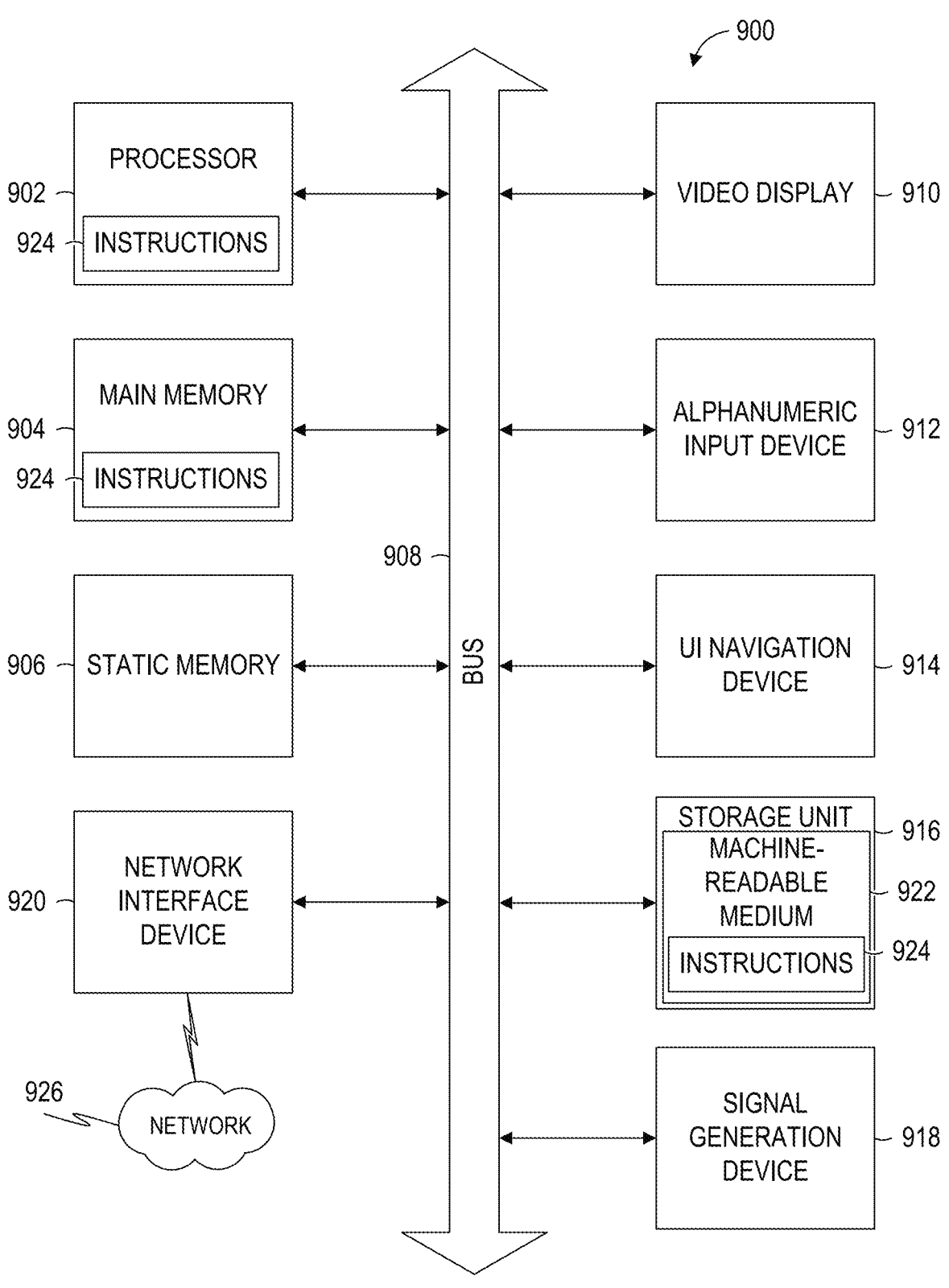
FIG. 9 shows a block diagram of a machine in the example form of a computer system within which instructions may be executed for causing the machine to perform any one or more of the methodologies discussed herein.

FIG. 9 shows a block diagram of a machine in the example form of a computer system 900 within which instructions 924 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube [CRT]). The computer system 900 also includes an alphanumeric input device 912 (e.g., a keyboard or a touch-sensitive display screen), a user interface (UI)

navigation (or cursor control) device 914 (e.g., a mouse), a storage unit 916, a signal generation device 918 (e.g., a speaker), and a network interface device 920.

Machine-Readable Medium

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting a machine-readable medium 922.

While the machine-readable medium 922 is shown in FIG. 9 to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with the instructions 924. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

a memory that stores instructions; and one or more processors coupled to the memory and configured to execute the instructions to perform operations comprising:

receiving a plurality of descriptions, each description corresponding to one of a plurality of services, communication among the plurality of services being handled using one or more application programming interfaces (APIs);

generating, using an API, a vector embedding for each of the plurality of descriptions;

clustering the vector embeddings to generate a plurality of clusters, each cluster corresponding to a different subset of the plurality of services;

receiving a request describing a target service;

generating, using the API, a vector embedding for the request;

selecting, based on the vector embedding for the request, a cluster of the plurality of clusters;

selecting, from among the subset of the plurality of services corresponding to the selected cluster, a service; and providing, in response to the request, an identifier of the service.

2. The system of claim 1, wherein the selecting of the service from among the subset of the plurality of services corresponding to the selected cluster comprises generating a prompt for a large language model (LLM) that identifies the subset of the plurality of services corresponding to the selected cluster.

3. The system of claim 1, wherein the generating of the plurality of clusters comprises generating a predetermined number of clusters.

4. The system of claim 1, wherein the generating of the plurality of clusters comprises using K-means clustering.

5. The system of claim 1, wherein the operations further comprise determining a vector embedding for each cluster of the plurality of clusters.

6. The system of claim 5, wherein the selecting of the cluster comprises determining a correlation coefficient between the vector embedding for the request and each of the vector embeddings for the plurality of clusters.

7. The system of claim 6, wherein the selecting of the cluster comprises selecting the cluster having a highest correlation coefficient.

8. The system of claim 1, wherein the selecting of the service comprises determining a correlation coefficient between the vector embedding for the request and the vector embedding for the description of each service of the subset of the plurality of services corresponding to the selected cluster.

9. The system of claim 1, wherein the selecting of the service comprises selecting the service having a highest correlation coefficient.

10. A non-transitory computer-readable medium that stores instructions that, when executed by one or more processors, cause the one or more processors to perform operations comprising:

receiving a plurality of descriptions, each description corresponding to one of a plurality of services, communication among the plurality of services being handled using one or more application programming interfaces (APIs);

generating, using an API, a vector embedding for each of the plurality of descriptions;

clustering the vector embeddings to generate a plurality of clusters, each cluster corresponding to a different subset of the plurality of services;

receiving a request describing a target service;

generating, using the API, a vector embedding for the request;

selecting, based on the vector embedding for the request, a cluster of the plurality of clusters;

selecting, from among the subset of the plurality of services corresponding to the selected cluster, a service; and providing, in response to the request, an identifier of the service.

11. The non-transitory computer-readable medium of claim 10, wherein the selecting of the service from among the subset of the plurality of services corresponding to the selected cluster comprises generating a prompt for a large language model (LLM) that identifies the subset of the plurality of services corresponding to the selected cluster.

12. The non-transitory computer-readable medium of claim 10, wherein the generating of the plurality of clusters comprises generating a predetermined number of clusters.

13. The non-transitory computer-readable medium of claim 10, wherein the generating of the plurality of clusters comprises using K-means clustering.

14. The non-transitory computer-readable medium of claim 10, wherein the operations further comprise determining a vector embedding for each cluster of the plurality of clusters.

15. The non-transitory computer-readable medium of claim 14, wherein the selecting of the cluster comprises determining a correlation coefficient between the vector embedding for the request and each of the vector embeddings for the plurality of clusters.

16. The non-transitory computer-readable medium of claim 15, wherein the selecting of the cluster comprises selecting the cluster having a highest correlation coefficient.

17. The non-transitory computer-readable medium of claim 10, wherein the selecting of the service comprises determining a correlation coefficient between the vector embedding for the request and the vector embedding for the description of each service of the subset of the plurality of services corresponding to the selected cluster.

18. A method comprising:

receiving, by one or more processors, a plurality of descriptions, each description corresponding to one of a plurality of services, communication among the plurality of services being handled using one or more application programming interfaces (APIs);

generating, using an API, a vector embedding for each of the plurality of descriptions;

clustering the vector embeddings to generate a plurality of clusters, each cluster corresponding to a different subset of the plurality of services;

receiving a request describing a target service;

generating, using the API, a vector embedding for the request;

selecting, based on the vector embedding for the request, a cluster of the plurality of clusters;

selecting, from among the subset of the plurality of services corresponding to the selected cluster, a service; and providing, in response to the request, an identifier of the service.

19. The method of claim 18, wherein the selecting of the service from among the subset of the plurality of services corresponding to the selected cluster comprises generating a prompt for a large language model (LLM) that identifies the subset of the plurality of services corresponding to the selected cluster.

20. The method of claim 18, wherein the generating of the plurality of clusters comprises generating a predetermined number of clusters.

* * * * *